(12) United States Patent
Ozawa et al.

(10) Patent No.: US 9,342,765 B2
(45) Date of Patent: May 17, 2016

(54) IMAGE FORMING APPARATUS AND IMAGE FORMING METHOD (71) Applicant: KONICA MINOLTA, INC., Chiyoda-ku, Tokyo (JP)

(72) Inventors: Fusako Ozawa, Hachioji (JP); Masatoshi Hitaka, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/588,639

(22) Filed: Jan. 2, 2015

(65) Prior Publication Data

US 2015/0227823 A1     Aug. 13, 2015

(30) Foreign Application Priority Data

Feb. 7, 2014    (JP) ................................ 2014-022793

(51) Int. Cl.
    *G06K 15/00*       (2006.01)
    *G06K 15/02*       (2006.01)
    *B41J 11/00*       (2006.01)
             (Continued)

(52) U.S. Cl.
    CPC ........... *G06K 15/1809* (2013.01); *B41J 11/008* (2013.01); *B41J 11/42* (2013.01); *B41J 15/04* (2013.01); *G06K 15/022* (2013.01); *G06K 15/1823* (2013.01)

(58) Field of Classification Search
    CPC ....... G06K 15/00; G06K 15/10; G06K 15/16; G06K 15/02; G06K 2215/0077; G06K 2215/0082; G06K 15/1809; G06K 15/1823; G06K 15/022; H04N 1/12; H04N 2201/0082; B41J 19/202

USPC .................. 358/1.1, 1.5, 1.9, 2.1, 1.11–1.18; 399/396, 208, 397; 347/250, 235
See application file for complete search history.

(56) References Cited

U.S. PATENT DOCUMENTS 5,132,719 A * 7/1992 Kioka .................. G03G 15/234
                                                               355/24
5,913,018 A * 6/1999 Sela ........................ G06K 15/00
                                                              358/1.13

(Continued)

FOREIGN PATENT DOCUMENTS

JP           11115278 A      4/1999
JP       2006289655 A    10/2006

(Continued)

OTHER PUBLICATIONS

Japanese Office Action (and English translation thereof) dated Feb. 2, 2016, issued in counterpart Japanese Application No. 2014-022793.

*Primary Examiner* — Chad Dickerson
(74) *Attorney, Agent, or Firm* — Holtz, Holtz & Volek PC (57) ABSTRACT

An image forming apparatus includes: a printing unit configured to print at a plurality of linear velocities; an image preparing time determination unit configured to determine a print image preparing time necessary for developing print data to a print image to be printed by the printing unit; a linear velocity determination unit configured to determine the linear velocity according to the print image preparing time determined by the image preparing time determination unit; and an engine control unit configured to operate the printing unit at the linear velocity determined by the linear velocity determination unit.

16 Claims, 6 Drawing Sheets

(51) Int. Cl.
  *B41J 11/42* (2006.01)
  *B41J 15/04* (2006.01)
  *G06F 3/12* (2006.01)

(56) References Cited

U.S. PATENT DOCUMENTS

| | | | | |
|---|---|---|---|---|
| 6,100,998 | A * | 8/2000 | Nagao | G06K 15/02 358/1.9 |
| 8,804,183 | B2 | 8/2014 | Kasai et al. | |
| 2006/0075909 | A1 * | 4/2006 | Hoshi | B41L 13/04 101/114 |
| 2009/0080024 | A1 * | 3/2009 | Liu | G06F 3/1204 358/1.16 |
| 2009/0129806 | A1 * | 5/2009 | Sunada | G03G 15/234 399/82 |
| 2013/0020758 | A1 * | 1/2013 | Momose | B41J 11/0095 271/227 |
| 2014/0241747 | A1 * | 8/2014 | Ito | G03G 15/205 399/68 |

FOREIGN PATENT DOCUMENTS

| | | | |
|---|---|---|---|
| JP | 2010000629 A | * | 1/2010 |
| JP | 2011101994 A | | 5/2011 |
| JP | 2012101419 A | | 5/2012 |

* cited by examiner

IMAGE FORMING APPARATUS AND IMAGE FORMING METHOD

The entire disclosure of Japanese Patent Application No. 2014-022793 filed on Feb. 7, 2014 including description, claims, drawings, and abstract are incorporated herein by reference in its entirety.

BACKGROUND OF THE INVENTION

1. Field of the Invention

The present invention relates to an image forming apparatus and an image forming method.

2. Description of the Related Art

In recent image forming apparatus, a speed to print an image on a print media such as a paper sheet is improved. On the other hand, according to an increase in a data amount of the image, it takes time to perform raster image processing (RIP) to develop the image to a print image (raster image). Therefore, and there are increasing cases where a RIP time becomes slower than a print speed and the RIP cannot catch up with the print depending on an image content. Especially, in a case where a continuous paper sheet is printed, when the print is too late, idle feeding of the paper sheet is generated and the paper sheet is wasted.

In order to reduce the waste of the paper sheet, for example, in JP 2010-629 A, a speed necessary for the RIP (RIP speed) is calculated by performing the RIP of a measured amount which is previously set. At this time, when the RIP has ended or when the calculated RIP speed exceeds the print speed, the print is immediately started. On the other hand, when the RIP speed is slower than the print speed, the print is started after the RIP is performed until the print time becomes longer than the remaining RIP time.

However, after all, a solution to a problem is not to perform the print until the RIP ends in the related art. The conventional problem is that a RIP speed does not catch up a print speed. In this way, since the idle feeding can be prevented, the waste of paper sheets is reduced.

However, in the related art, when there is not enough capacity in the memory to store the images to which the RIP is performed, there is a problem in that the print is immediately stopped and productivity is deteriorated.

SUMMARY OF THE INVENTION

An object of the present invention is to provide an image forming apparatus and an image forming method which can deteriorate productivity and reduce waste of paper sheets even when a RIP speed is slower than a print speed.

The abovementioned object of the present invention will be achieved by the following steps.

(1) To achieve the abovementioned object, according to an aspect, an image forming apparatus reflecting one aspect of the present invention comprises a printing unit configured to print at a plurality of linear velocities; an image preparing time determination unit configured to determine a print image preparing time necessary for developing print data to a print image to be printed by the printing unit; a linear velocity determination unit configured to determine the linear velocity according to the print image preparing time determined by the image preparing time determination unit; and an engine control unit configured to operate the printing unit at the linear velocity determined by the linear velocity determination unit.

(2) The image forming apparatus according to (1), wherein the image preparing time determination unit preferably determines a necessary time from an ending time of the development of the print data of a first sheet to the print image to an ending time of the development of the print data of a second sheet to the print image as the print image preparing time.

(3) The image forming apparatus according to (1), wherein the image preparing time determination unit preferably determines a time necessary for developing the print data of the plurality of sheets to the respective print images as the print image preparing time.

(4) The image forming apparatus according to (3), wherein when the image preparing time determination unit has determined the image preparing time from the time necessary for developing the print data of the plurality of sheets to the respective print images in a case where a difference between the maximum value and the minimum value of the obtained plurality of image preparing times is within a predetermined value, the linear velocity determination unit preferably determines the linear velocity from an average value of the obtained plurality of image preparing times.

(5) The image forming apparatus according to any one of (1) to (4), wherein the printing unit is preferably capable of printing at a first linear velocity and a second linear velocity slower than the first linear velocity and preferably defines an interval from a drawing end position of one image to a drawing start position of a next image as a paper sheet interval, the linear velocity determination unit preferably compares two cases, i.e., a case where print is performed at the first linear velocity at the second paper sheet interval which is wider than the predetermined first paper sheet interval and a case where the print is performed at the first paper sheet interval and at the second linear velocity and preferably determines the first linear velocity as the linear velocity and the second paper sheet interval as the paper sheet interval in a case where the print performed at the second paper sheet interval and at the first linear velocity ends faster when the same number of the paper sheets are printed.

(6) The image forming apparatus according to any one of (1) to (4), wherein the linear velocity determination unit preferably determines a paper sheet interval so as to be a predetermined paper sheet interval when a print media to be used to print is label roll paper.

(7) The image forming apparatus according to any one of (1) to (6), wherein it further preferably comprises an operation mode setting unit preferably sets a mode according to a print media to be used to print to an operation mode for determining the linear velocity based on the image preparing time or an operation mode other than that from the operation mode for determining the linear velocity based on the image preparing time and the operation mode other than that.

(8) The image forming apparatus according to any one of (1) to (6), wherein it further preferably comprises an operation mode setting unit configured to set a mode according to an input from a user to an operation mode for determining the linear velocity based on the image preparing time or an operation mode other than that from the operation mode for determining the linear velocity based on the image preparing time and the operation mode other than that.

(9) The image forming apparatus according to any one of (1) to (8), wherein it further preferably comprises a linear velocity display unit configured to display the linear velocity determined by the linear velocity determination unit on an operation panel to inform a user of the linear velocity.

(10) To achieve the abovementioned object, according to an aspect, an image forming method reflecting one aspect of the present invention comprises a step for determining a print image preparing time necessary for developing print data to a print image; a step for determining a linear velocity according to the print image preparing time; and a step for operating the printing unit at the determined linear velocity and printing, wherein the image forming method is used by an image forming apparatus including a printing unit capable of printing at a plurality of linear velocities.

(11) The image forming method according to (10), wherein the step for determining the print image preparing time preferably determines a necessary time from an ending time of development of the print data of a first sheet to the print image to an ending time of the development of the print data of a second sheet to the print image as the print image preparing time.

(12) The image forming method according to (10), wherein the step for determining the print image preparing time preferably determines a time necessary for developing the print data of the plurality of sheets to the respective print images as the print image preparing time.

(13) The image forming method according to (12), wherein when a difference between the maximum value and the minimum value of a plurality of image preparing times obtained from the time necessary for developing the print data of the plurality of sheets to the respective print images is within a predetermined value, the step for determining the linear velocity preferably determines the linear velocity from an average value of the obtained plurality of image preparing times.

(14) The image forming method according to any one of (10) to (13), wherein the printing unit is preferably capable to print at a first linear velocity and a second linear velocity slower than the first linear velocity and preferably defines an interval from a drawing end position of one image to a drawing start position of a next image as a paper sheet interval, the step for determining the linear velocity preferably compares two cases, i.e., a case where print is performed at the first linear velocity at the second paper sheet interval which is wider than the predetermined first paper sheet interval and a case where the print is performed at the first paper sheet interval and at the second linear velocity and preferably determines the first linear velocity as the linear velocity and the second paper sheet interval as the paper sheet interval in a case where the print performed at the second paper sheet interval and at the first linear velocity ends faster when the same number of the paper sheets are printed.

(15) The image forming method according to any one of (10) to (13), wherein the step for determining the linear velocity preferably determines a paper sheet interval so as to be a predetermined paper sheet interval when a print media to be used to print is label roll paper.

(16) The image forming method according to any one of (10) to (15), wherein it further preferably comprises a step for setting a mode according to a print media to be used to print to an operation mode for determining the linear velocity based on the image preparing time or an operation mode other than that from the operation mode for determining the linear velocity based on the image preparing time and the operation mode other than that before the step for determining the print image preparing time.

(17) The image forming method according to any one of (10) to (15), wherein it further preferably comprises a step for setting a mode according to an input from a user to an operation mode for determining the linear velocity based on the image preparing time or an operation mode other than that from the operation mode for determining the linear velocity based on the image preparing time and the operation mode other than that before the step for determining the print image preparing time.

(18) The image forming method according to anyone of (10) to (17), wherein it further preferably comprises a step for displaying the linear velocity determined by the step for determining the linear velocity on an operation panel to inform a user of the linear velocity.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

First Embodiment

Figure 1:
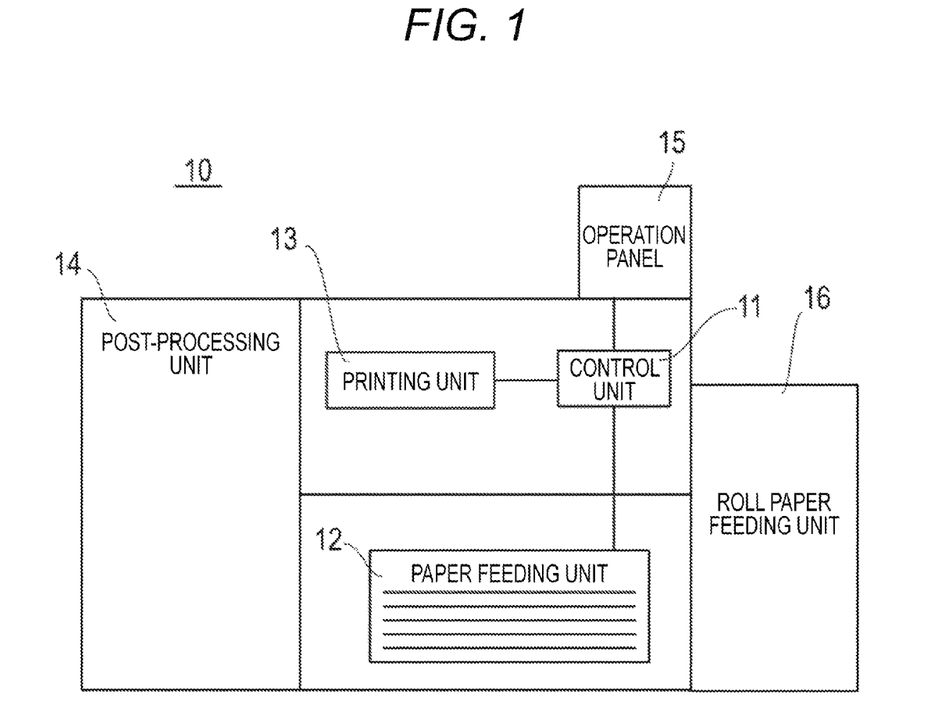
FIG. 1 is an explanatory diagram of a structure of an image forming apparatus according to an embodiment to which the present invention is applied.
Figure 2:
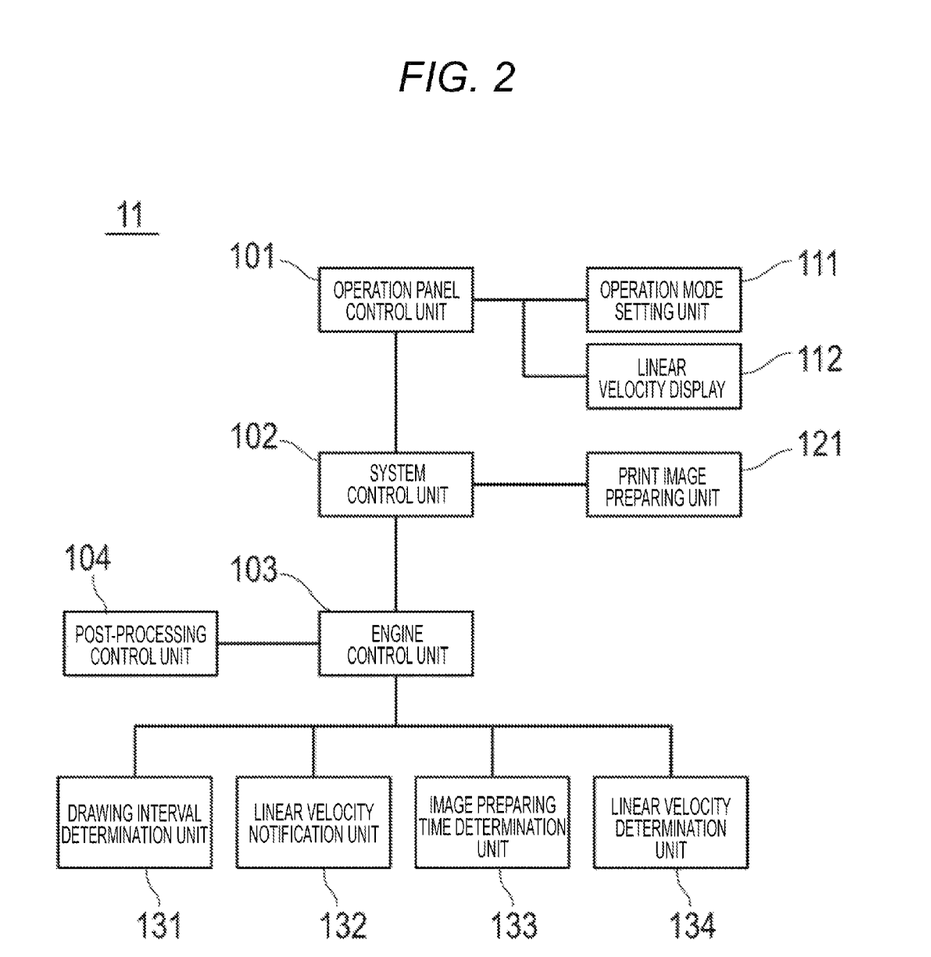
FIG. 2 is a block diagram to describe a function of a control unit in the image forming apparatus.

FIG. 1 is an explanatory diagram of a structure of an image forming apparatus according to an embodiment to which the present invention is applied. FIG. 2 is a block diagram to describe a function of a control unit in the image forming apparatus.

An image forming apparatus 10 according to the embodiment to which the present invention is applied includes a control unit 11, a paper feeding unit 12, a printing unit 13, a post-processing unit 14, an operation panel 15, and a roll paper feeding unit 16.

In a basic operation of the image forming apparatus 10, a roll-shaped continuous paper sheet (referred to as roll paper) stored in the roll paper feeding unit 16 is fed from the roll paper feeding unit 16 to the printing unit 13 and is printed. Postprocessing to which a print setting is performed is performed to the printed roll paper. For example, the printed roll paper is winded by the post-processing unit 14 or cut into a predetermined length. Also, a paper sheet (cut paper) which is cut from the first is supplied from the paper feeding unit 12 and fed to the printing unit 13, and then, printed. The post-processing, to which the print setting is set, is performed by the post-processing unit 14 to the printed cut paper.

Each part of the embodiment will be described in detail below.

The control unit 11 mainly includes four components, i.e., an operation panel control unit 101, a system control unit 102, an engine control unit 103, and a post-processing control unit 104 as illustrated in FIG. 2.

The operation panel control unit 101 includes an operation mode setting unit 111 and a linear velocity display 112. The operation mode setting unit 111 sets an operation mode according to a kind of the paper sheet and sets an operation mode by receiving an input to set a desired operation mode from the user. The linear velocity display 112 displays linear velocity information notified by a linear velocity notification unit 132 (to be described) in the engine control unit 103 on the operation panel 15. The operation mode setting unit 111 notifies the engine control unit 103 of the set operation mode.

The system control unit 102 includes a print image preparing unit 121 to extract print data from a print job received from an external device and perform the RIP. Data of a print image (raster image) of one sheet to which the RIP is performed by the print image preparing unit 121 is stored in a memory (not shown). It is preferable that the memory be included in the control unit 11 and have a capacity in which a RIP data of at least two pages or more can be stored (to be described in detail below). When the RIP for one sheet has been completed as a page printed by the print image preparing unit 121, the system control unit 102 issues a print instruction to the engine control unit 103.

Also, the system control unit 102 controls each part of the image forming apparatus. The control of each part is basic control regarding the operation of the image forming apparatus 10. The basic control includes the print according to the print setting included in the print job and the control of the postprocessing relative to the paper sheet before/after the print. This basic control is similar to that of the normal image forming apparatus 10. Therefore, the description on the basic control is omitted.

The engine control unit 103 performs control necessary for the printing unit 13 to print. The engine control unit 103 receives the print instruction as input information, and an image preparing time determination unit 133 determines an image preparing time. A drawing interval determination unit 131 and a linear velocity determination unit 134 respectively determine a drawing interval and a linear velocity based on the determination result and the operation mode set by the operation mode setting unit 111.

The engine control unit 103 performs the printing operation by the printing unit 13 according to the determined linear velocity. The linear velocity notification unit 132 informs the system control unit 102 of the determined linear velocity, and the determined linear velocity is displayed on the operation panel 15 by the linear velocity display 112 of the operation panel control unit 101.

The post-processing control unit 104 controls the post-processing unit 14. For example, the post-processing unit 14 is operated according to the print setting which has been previously set (or included in the print job).

The control unit 11 includes a central processing unit (CPU), a read only memory (ROM), a random access memory (RAM), a non-volatile memory (hard disk, flash ROM, and the like), a network interface (NIF), and the like as a hardware similarly to a computer. Functions and operations of the respective parts are operated by performing a program created according to a procedure to be described.

The paper feeding unit 12 stores sheets of the cut paper as a print media. The paper feeding unit 12 conveys the paper sheet to the printing unit 13 according to the instruction from the control unit 11. The paper feeding unit 12 includes a paper feeding tray and can store a plurality of paper sheets in the tray. The paper feeding tray can store a film-shaped print media instead of the paper sheet.

By being controlled from the control unit 11 (engine control unit 103), the printing unit 13 prints an image on the print media such as the paper sheet according to a known imaging process such as an electrophotographic method, an electrostatic recording method, and ink jet printing. After the image has been printed by the printing unit 13 on the print media conveyed from the paper feeding unit 12, the print media is conveyed to the post-processing unit 14. The printing unit 13 can change a paper sheet conveying speed (linear velocity) at the time of the print. In response to a command from the engine control unit 103, the printing unit 13 prints at the linear velocity selected according to the procedure to be described.

The printing unit 13 includes functions, for example, a color print function such as monochrome/color, an enlargement/reduction function, a single-sided/double sided print function, a page allocating function such as 2 in 1 and 4 in 1, and a function for changing a direction of the image. Each print function is set as one function of the print setting.

The post-processing unit 14 performs various postprocessing relative to the printed paper sheet conveyed from the printing unit 13 by the control of the control unit 11 (post-processing control unit 104). The post-processing function is, for example, a cut function for cutting the roll paper into a predetermined size, a punch function for punching a punch hole at a predetermined position (binding direction) relative to the paper sheet after it is cut, a stapling function for stapling with a staple, and a folding function for folding the paper sheet with a predetermined folding method. These post-processing functions are set in the print setting included in the print job or set by the user from the operation panel 15.

The operation panel 15 includes a display for performing various displays and an input device such as a touch panel, a numeric keypad, a start button, and a stop button. The operation panel 15 is used to display various information and input various instructions by the control of the operation panel control unit 101.

In addition to the paper feeding unit 12, the roll paper feeding unit 16 stores the continuous roll paper rolled in a roll shape as the print media. When an instruction to print on the roll paper has been issued, the roll paper is supplied from the roll paper feeding unit 16 to the printing unit 13. Two kinds of the sheets of the roll paper are used in the present embodiment. One of them is a simple roll paper in which a print position is not specified. Another one is the roll paper in which the print position has been previously specified. For example, each sheet of label roll paper has a predetermined size and continues in the roll shape. In many cases, each sheet of the label roll paper is a seal. At the time of printing, it is necessary to print the image on each sheet. Therefore, the print position (printing interval) has been previously determined.

The image forming apparatus 10 is connected to the computer not shown such as a general personal computer via a network. The print job is transmitted from the computer to the image forming apparatus 10. The network connects the computer with the image forming apparatus 10 and transfers the print job and other information between them. For example, a LAN can be used as the network. Also, the network may be a line and a dedicated line which directly connects the computer with the image forming apparatus 10. In addition, the print job may be directly supplied to the image forming apparatus 10 from various portable storage media and the like.

Figure 3:
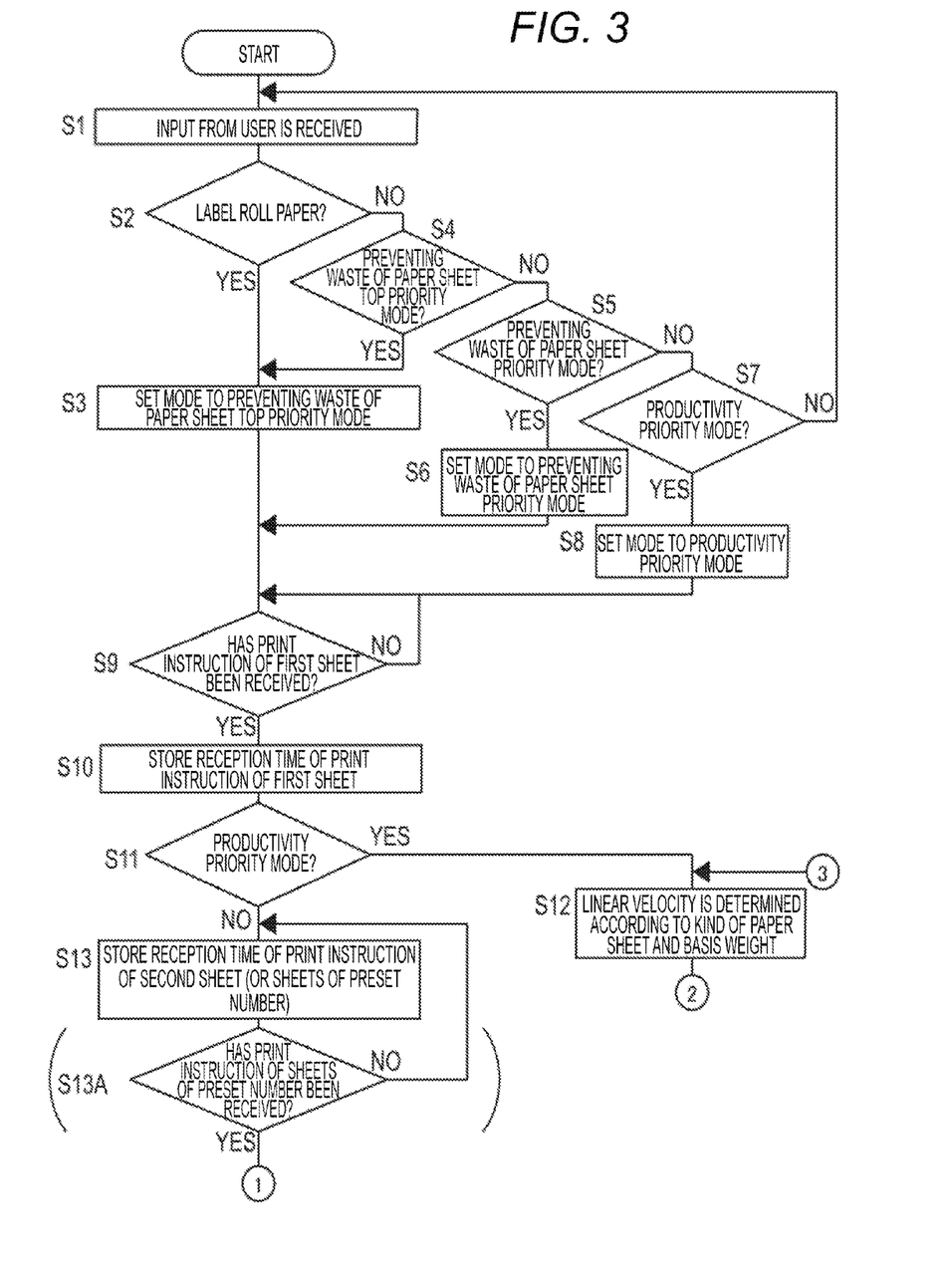
FIG. 3 is a flowchart to describe a processing procedure of a printing operation.
Figure 4:
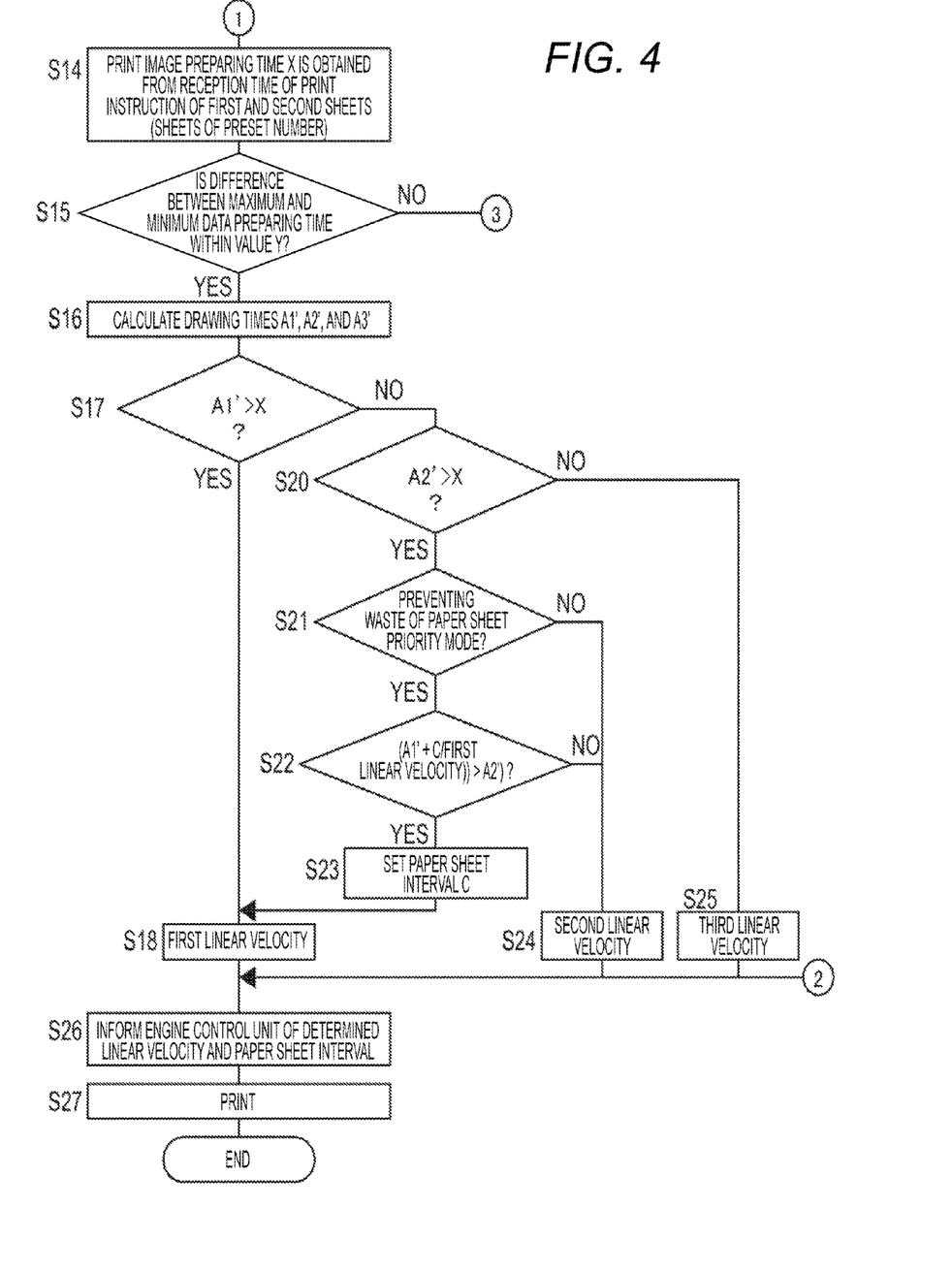
FIG. 4 is a flowchart to describe a processing procedure of the printing operation continued from that in FIG. 3.

The print to the roll paper will be described below as an example of the operation of the image forming apparatus 10. FIGS. 3 and 4 are flowcharts to describe a processing procedure of a printing operation. In the description below, a mode in which the linear velocity is determined according to a print image preparing time and operated is called as "preventing waste of paper sheet top priority mode" and "preventing waste of paper sheet priority mode". A mode in which productivity has higher priority even when the paper sheet interval becomes long and the paper sheet is wasted is called as "productivity priority mode".

Here, a difference between "preventing waste of paper sheet top priority mode" and "preventing waste of paper sheet priority mode" will be described. When the label roll paper is used, a print interval is determined. The label roll paper is the continuous paper sheet (roll paper) on which the print has to be performed at a constant interval. On the other hand, there is a case where it is not necessary for the print media to have a constant printing interval when the print media is the simple roll paper which is a simple continuous paper sheet. In the present embodiment, a mode in which the waste of the paper sheet is reduced while the printing interval is certainly maintained constant based on the premise of the print on the label roll paper is called as "preventing waste of paper sheet top priority mode". On the other hand, a mode in which it is not necessary to have the constant interval although the waste of the paper sheet is reduced as possible is called as "preventing waste of paper sheet priority mode".

An operation procedure will be described with reference to FIG. 3.

First, after receiving the print job (not shown) or instructing to perform the printing, the system control unit 102 displays a paper setting screen on the operation panel 15 by the operation panel control unit 101 and receives an input of a paper sheet setting and a priority mode setting from the user (S1). Also, the system control unit 102 instructs the print image preparing unit 121 to start the RIP of the first sheet at this stage.

Figure 5A:
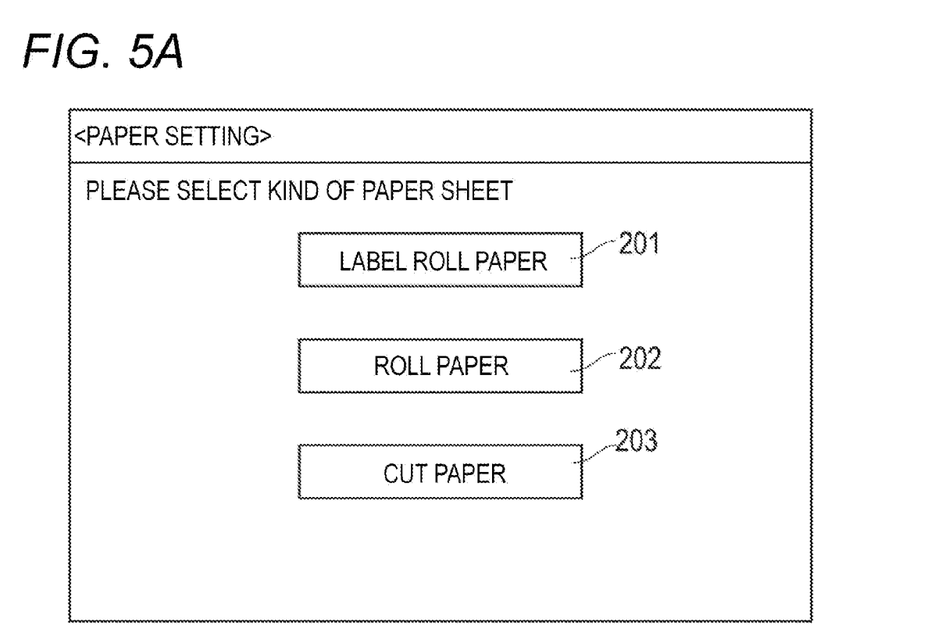
FIGS. 5A and 5B are explanatory diagrams to describe exemplary paper setting screens.
Figure 5B:
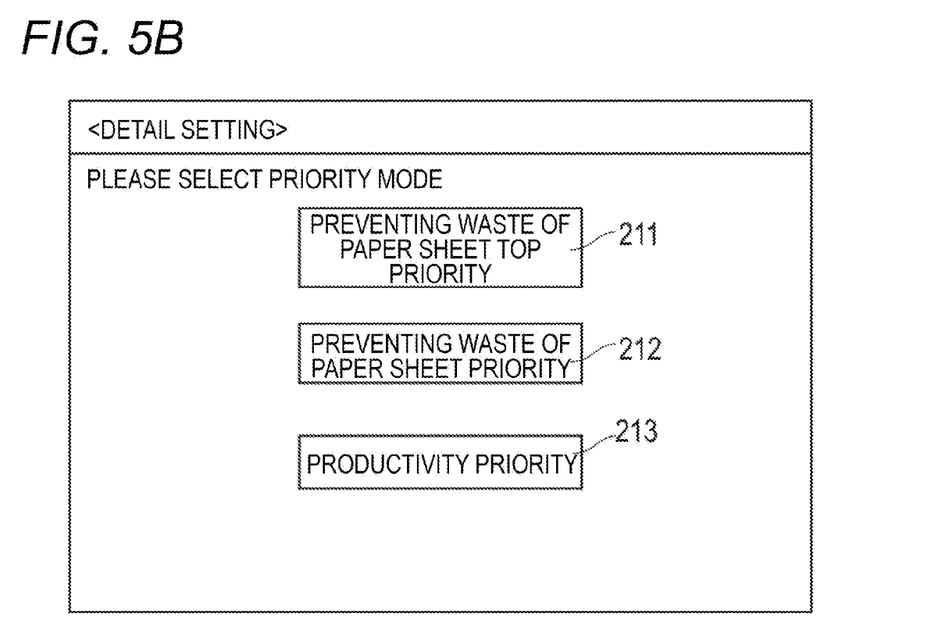

FIGS. 5A and 5B are explanatory diagrams to describe exemplary paper setting screens.

In S1, firstly, kind of paper sheet selecting screen is displayed on the touch panel of the operation panel 15 as illustrated in FIG. 5A. A "label roll paper" button 201, a "roll paper" button 202, and a "cut paper" button 203 are displayed on the kind of paper sheet selecting screen.

The user selects the kind of the paper sheet from the screen. When the roll paper and the cut paper have been selected, a detail setting screen illustrated in FIG. 5B is displayed. A "preventing waste of paper sheet top priority" button 211, a "preventing waste of paper sheet priority" button 212, and a "productivity priority" button 213 are displayed on the detail setting screen. The user sets the priority from this screen.

When the label roll paper has been selected from the kind of paper sheet selecting screen, it is necessary to print and draw at a constant interval. Therefore, the preventing waste of paper sheet top priority mode is certainly set. When the label roll paper has been selected, it is not necessary to display the next detail setting screen.

Also, it is preferable to change the default according to the kind of the paper sheet on the detail setting screen. For example, since the roll paper (not the label roll paper) is the continuous paper sheet, "waste of paper sheet preventing priority" is set as the default, and since the cut paper does not waste the paper (means "life priority" rather than preventing the waste of the paper sheet), "productivity priority" is set as the default.

When the input is received, the operation mode setting unit 111 of the operation panel control unit 101 subsequently sets the operation mode. When the label roll paper is selected (S2: YES), the mode is set to "preventing waste of paper sheet top priority mode" (S3). On the other hand, when the label roll paper is not selected (S2: NO), the mode is set to "preventing waste of paper sheet top priority mode" (S3) in a case where the input from the user is "preventing waste of paper sheet top priority mode" (S4: YES).

When the input from the user is not "preventing waste of paper sheet top priority mode" (S4: NO) and the input is "preventing waste of paper sheet priority mode" (S5: YES), the mode is set to "preventing waste of paper sheet priority mode" (S6).

When "preventing waste of paper sheet priority mode" is not input (S5: NO) and "productivity priority mode" is input (S7: YES), the mode is set to "productivity priority mode" (S8). When "productivity priority mode" is not set in S7, the procedure returns to S2 in order to wait for the input from the user.

In the present embodiment, the user selects the kind of the paper sheet and inputs the detail setting of the operation mode from the operation panel 15 as described above. Alternatively, the print setting included in the print job may include the kind of the paper sheet and the detail setting of the operation mode. In this case, the operation mode is set with reference to the print setting instead of the reception of the input from the user.

When the setting of the operation mode has been completed according to the above processing, the processing of the engine control unit 103 subsequently starts. First, when the engine control unit 103 has received the print instruction of a first sheet from the system control unit 102 (S9), the engine control unit 103 stores the time immediately after receiving the instruction (S10). As has been described above, the print instruction is issued to the engine control unit 103 from the system control unit 102 at the time when the RIP of the print data is completed. That is, the time is when development of the print data to the print image has been completed. The print is not performed at this stage. When the print instruction is not received in S9, the engine control unit 103 waits for the print instruction.

Subsequently, it is determined whether the current mode is the productivity priority mode (S11). When the productivity priority mode has been set (S11: YES), the linear velocity determination unit 134 determines the linear velocity according to the kind of the paper sheet and basis weight (S12). After that, the print is performed (S26 and S27).

On the other hand, when it is determined that the mode is not the productivity priority mode in S11 (S11: NO), that is, when "preventing waste of paper sheet top priority mode" or "preventing waste of paper sheet priority mode" has been set, the image preparing time is subsequently determined as the processing of the image preparing time determination unit 133. The image preparing time determination unit 133 stores the time when the engine control unit 103 has received the print instruction of a second sheet from the system control unit 102 (S13). The system control unit 102 instructs the engine control unit 103 to print the image every time when the RIP is completed. In the present embodiment, in order to determine the print image preparing time (that is, RIP time), the print is not performed until the print image of at least two sheets is prepared, that is, until the RIP of the second sheet has been completed. Therefore, it is necessary to have a capacity to store the print image for at least two sheets (two pages) as a capacity of the memory for temporarily storing the print image after the RIP.

The processing of S13 and S10 is processing which is necessary to calculate the print image preparing time. Basically, the print image preparing time is calculated from a difference between the time when the print instruction of the first sheet has been received and the time when the print instruction of the second sheet has been received. However, the print image preparing time may be calculated from a difference among the print instruction times of a plurality of sheets. In this case, the respective print instruction reception times of the preset number of sheets after the second sheet are stored as the processing indicated between parentheses in S13 in FIG. 3. Then, it is determined whether the preset number of sheets of the print instruction reception has been prepared (S13A). The processing of S13 and S13A may be repeated until the print instructions of the necessary number of sheets are received.

The print image preparing time is calculated from a difference between the first and second sheets when almost same images (for example, an image for being printed by using a certain format and having contents such as an address and name which are different from each other or the same pictures) are continuously printed such as the print on the label roll paper. In this case, it takes almost the same time to prepare (RIP) the other pages. Therefore, even when the print image preparing time is determined from a difference between the first and second sheets, there is few cases where the RIP cannot catch up with the print and the print stops in the middle. On the other hand, when the various print images are sequentially output, each image has different time necessary for the RIP. In this case, the time when the print instructions of the plurality of sheets have been received is obtained, and the print image preparing time is obtained by the obtained time (that is, to perform S13A). It is preferable that the average of these times be the print image preparing time.

Next, with reference to FIG. 4, the image preparing time determination unit 133 obtains a print image preparing time X by calculating a difference between the stored print instruction times (S14). At this time, when the stored print instruction times are the print instruction times when the first and second sheets have been respectively received, a difference between them is calculated. When the reception times of the print instructions of the plurality of sheets have been stored, a difference among the print instruction reception times is calculated. Specifically, the difference is a difference between the instruction received times of the first and second sheets, a difference between the instruction received times of the second and third sheets, and a difference between the instruction received times of the third and fourth sheets. Until the sheets of a preset number have been calculated, the differences are obtained. When the print image preparing time has been calculated from the plurality of print instruction times in this way, the plurality of print image preparing times can be obtained.

Next is processing of the linear velocity determination unit 134. The linear velocity determination unit 134 determines whether a difference between the maximum and the minimum of the obtained print image preparing time is within a predetermined value Y (S15). In this processing, when the print image preparing time has been obtained from the difference between the first and second sheets, it is determined whether the obtained value is within the value Y. When the plurality of print image preparing times has been obtained, it is determined whether the difference between the maximum and minimum of those is within the value Y.

Here, when the difference between the maximum and minimum of the print image preparing times is not within the value Y, a constant linear velocity is obtained from the kind of the paper sheet and the basis weight similarly to the productivity priority mode (S12). Here, the fact that the difference between the maximum and minimum of the plurality of print image preparing times is large means that fluctuation of time to perform the RIP to each image is large. In this case, it is difficult to change the linear velocity for each image. Also, for example, even when the linear velocity is changed for each image, the performance and stop of the print are repeated in an extreme case. Accordingly, the productivity is deteriorated. In the present embodiment, the adjustment of the linear velocity in following processing has no priority in these cases, and the productivity has the priority similarly to the productivity priority mode. Also, similarly to a case where the print image preparing time X obtained from the first and second sheets is larger than the value Y, since the time to prepare the print image (RIP) becomes too long, the time cannot be shortened by adjusting the linear velocity in the following processing. Therefore, the productivity takes the priority similarly to the productivity priority mode. Even when the print image preparing time (RIP time) greatly fluctuates for each page of the print data, the user may cancel the productivity priority by informing the user of that the mode becomes the productivity priority in this case (display that on the operation panel 15 and the like). In this case, the performance and stop of the print are repeated in the extreme case. However, since this can reduce the waste of paper, the user is allowed to select the mode.

Subsequently, the linear velocity determination unit 134 calculates a drawing time (S16). The drawing time can be obtained from a drawing interval A, a paper sheet interval B, and the linear velocity by using a formula. The formula is drawing time=(A+B)/linear velocity.

Figure 6:
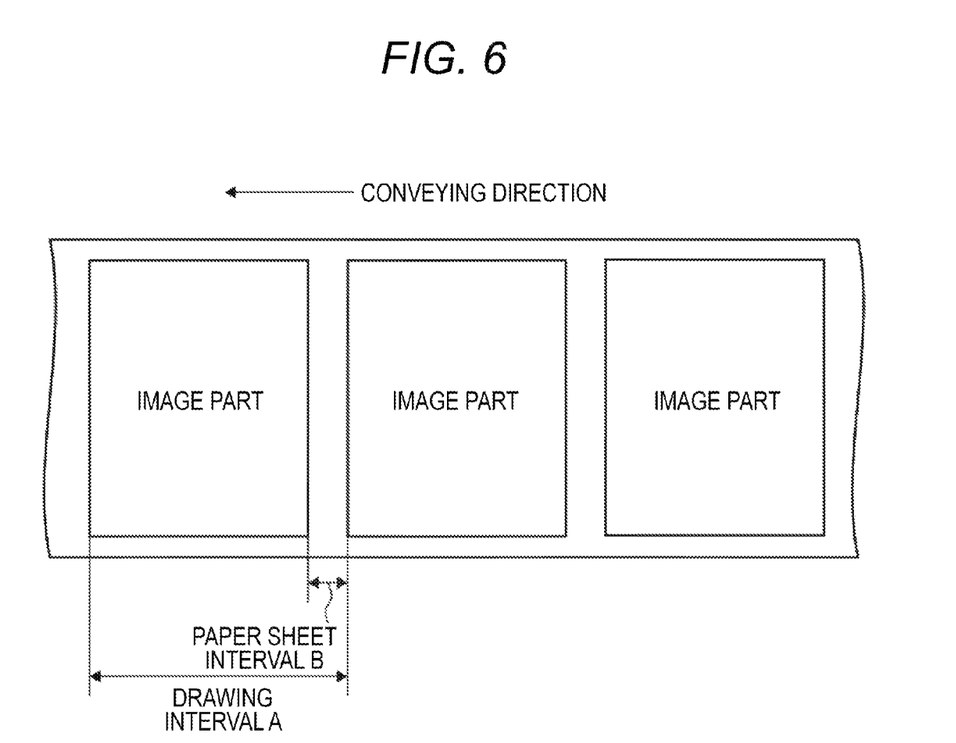
FIG. 6 is an explanatory diagram to describe a drawing interval and a paper sheet interval.

FIG. 6 is an explanatory diagram to describe the drawing interval and the paper sheet interval. As illustrated in FIG. 6, the drawing interval A is from a drawing start position of a part on the paper sheet where the image is printed (draw) to a drawing start position of the next image. Since there are many cases where the roll paper is cut at this interval after the print, in such a case, the drawing interval A becomes the same as the paper sheet size. The paper sheet interval B is from the drawing end position of a certain image to the drawing start position of the next image when the roll paper is printed. The paper sheet interval can be changed when the simple roll paper is used. However, the paper sheet interval has been previously determined according to the kind of the label roll paper when the label roll paper is used. The linear velocity is a paper sheet feeding speed in a paper sheet conveying direction at the time of the print.

In the present embodiment, the linear velocity can be changed in stages (three stages). The linear velocity is first linear velocity>second linear velocity>third linear velocity in an order from the faster one. Therefore, three drawing times A1' to A3' corresponding to the linear velocities can be obtained. Accordingly, the drawing time satisfies A1'<A2'<A3'.

Subsequently, the linear velocity determination unit 134 determines whether the drawing time A1' is longer than the print image preparing time X (A1'>X) (S17). When the drawing time A1' is longer than the print image preparing time X (S17: YES), the first linear velocity is determined to be used (S18). When the plurality of print image preparing times X has been obtained from the print instruction reception times of the plurality of sheets, an average value of these is used as the print image preparing time X used in this stage.

On the other hand, when the drawing time A1' is not longer than the print image preparing time X (S17: NO), it is subsequently determined whether the drawing time A2' is longer than the print image preparing time X (A2'>X) (S20). When the drawing time A2' is longer than the print image preparing time X (S20: YES), it is subsequently determined whether the current mode is the preventing waste of paper sheet priority mode (S21). When the mode is the preventing waste of paper sheet priority mode (S21: YES), it is determined whether (drawing time A1'+(paper sheet interval C/first linear velocity)) satisfies ((A1'+(paper sheet interval C/first linear velocity))>A2') which is longer than the drawing time A2' (S22). When (drawing time A1'+(paper sheet interval C/first linear velocity)) is longer than the drawing time A2' (S22: YES), the paper sheet interval C is set (S23), and the first linear velocity is determined to be used (S18). The paper sheet interval C is a paper sheet interval in which the paper sheet interval becomes wider than that of a case where the print is performed at the paper sheet interval B previously determined according to the kind of the paper sheet and at the second linear velocity and the drawing time is shorter than A2' when the printing operation is performed at the first linear velocity.

The processing of S20 to S23 will be further described. When the roll paper and the cut paper are selected, "preventing waste of paper sheet priority mode" can be selected. When "preventing waste of paper sheet priority mode" has been selected, the paper sheet interval C is set and the first linear velocity is selected in a case where it is determined that the productivity is higher than that of a case where the print is performed at the paper sheet interval B set as the default according to the linear velocity of the A2' by allowing the paper sheet interval to be wider by the linear velocity of A1', that is, by delaying the print start of the next image after one sheet of the image is printed even when the condition of A2'>X is satisfied. Since the paper sheet interval C satisfies (A1'+(C/first linear velocity))>A2', the paper sheet interval C becomes wider than the formula above and the paper sheet interval B. Therefore, the paper sheet interval C may be a value for satisfying B<C<(A2'−A1')×first linear velocity.

In this way, the linear velocity determination unit 134 expects two cases and compares print times of the two cases, i.e., a case where the print is performed at the paper sheet interval C (second paper sheet interval) which is wider than the normal paper sheet interval B (first paper sheet interval) and at the first linear velocity and a case where the print is performed at the normal paper sheet interval B (first paper sheet interval) and at the second linear velocity. When the same number of paper sheets have been printed and the print has ended earlier in a case where the print is performed at the paper sheet interval C (second paper sheet interval) and at the first linear velocity (that is, when the productivity is higher), the first linear velocity is determined to be used, and at the same time, the paper sheet interval C (second paper sheet interval) at that time is determined.

According to this processing, this determination cannot be made when it is necessary to draw at regular intervals as the label roll paper (when the label roll paper is selected in the procedure of the present embodiment, "preventing waste of paper sheet priority mode" cannot be selected). However, when the roll paper can be cut separately and when the cut paper is selected, the waste of paper sheet is prevented by considering the productivity according to the processing of S20 to S23.

In S21 or S22, when "NO" is selected, the second linear velocity is set (S24).

Also, when the drawing time A2' is not longer than the print image preparing time X in S20 (S20: NO), the third linear velocity is set (S25).

According to the above, since the linear velocity and the paper sheet interval have been determined, the engine control unit 103 is informed about them (S26). With the control of the engine control unit 103, the printing operation by the printing unit 13 is started at the determined linear velocity and the paper sheet interval (S27). At this time, in the present embodiment, the print image to which the print has been completed is deleted from the memory every time when the print ends. However, when the memory has a large capacity and there is no problem to store the print image, the print image may be stored until lack of the memory capacity occurs.

The processing of the printing operation ends. The printing operation is continued until the print of all the print data is completed.

Next, the roll paper is exemplified, and determination processing of the linear velocity and the paper sheet interval will be described with reference to an example.

Regarding the roll paper, a drawing interval A [mm] and a paper sheet interval B [mm] are previously determined according to the paper sheet to be used (refer to FIG. 6). It is assumed that the linear velocity of the image forming apparatus 10 in the present embodiment be following three kinds.

A first linear velocity is 400 (mm/s), a second linear velocity is 300 (mm/s), and a third linear velocity is 200 (mm/s).

When the drawing times in which time conversion is performed to the drawing interval for each linear velocity are obtained, the drawing times become A1' (msec), A2' (msec), and A3' (msec).

To perform an output without any waste by using the first linear velocity at the time of the print image preparing time X (msec), it is preferable that the next condition be satisfied.

drawing interval $A1'$(msec)>print image preparing time $X$(msec)

When the image size corresponds to A4, it is assumed that the drawing interval (image size) A be 210 mm and the paper sheet interval B be 40 mm. It is assumed that the print image preparing time X (that is, a necessary time for performing the RIP to certain print data) be 0.7 (sec).

When the drawing intervals A1', A2', A3' (sec) at this time are calculated, a calculation formula is (A+B)/linear velocity. Therefore, the drawing times become A1'=0.625 (sec), A2'=0.833 (sec), and A3'=1.25 (sec).

Each productivity (how many sheets (pages) can be output for one minute) at this time is calculated. The calculation formula is 60/drawing interval.

Each productivity is A1'=96 (sec), A2'=72 (sec), and A3'=48 (sec).

When the label roll paper is used, A2' is selected.

When the roll paper and the cut paper are used and "preventing waste of paper sheet priority mode" is selected, the productivity in a case where the operation is performed at A1' is 60/0.7=85.7.

The productivity is higher than 72 which is the productivity of a case where the operation is performed at A2'. When the paper sheet interval C (mm) is calculated in a case where the operation is performed at A1', (paper sheet interval C/first linear velocity) (sec)=0.7−0.625=0.075 (sec).

When the operation is performed at A1', 0.075 sec becomes the paper sheet interval C=30 mm. That is, the operation can be performed with higher productivity than A2' by selecting the first linear velocity and allowing the paper sheet interval to be 30 mm.

According to the present embodiment described above, the following effects can be obtained.

(1) In the present embodiment, time to develop a print image (raster data) to be used to print the print data is determined as an image preparing time, and a linear velocity at the time when a printing unit prints according to the image preparing time based on the determination result is determined. The print is performed at the determined linear velocity. According to this, there becomes no case (fewer cases) where the print is stopped, and the deterioration of productivity can be prevented. In addition, generation of wasteful paper sheets which is not to be printed and a blank region where the drawing is not performed on the roll paper can be reduced.

(2) In the present embodiment, the image preparing time is determined from a period of time form the end of RIP of a first sheet to the end of the RIP of a second sheet in the print data. When the end of the RIP to all the print data of the plurality of pages (sheets) is waited, print waiting occurs during the RIP, and the productivity is reduced for that. In the present embodiment, the waste of time can be reduced by determining the image preparing time from the time necessary for performing the RIP to first two sheets. When the label roll paper of the roll paper is especially printed, printed images are similar to each other (amount of data does not greatly change for each page). Therefore, the wasted paper (blank region) can be reduced without sacrificing the productivity according to the determination regarding the first two pages in this way.

At the time of this determination, in the present embodiment, the image preparing time is the time between a starting time and an ending time. The starting time is a print instruction issued at the time of the end of the RIP to the first sheet, and the ending time is a print instruction issued at the end of the RIP to the second sheet. The image preparing time can include a real time when the RIP is actually performed and a delay time of a signal path associated with the processing by having the print instruction issued according to the end of the RIP as the starting time and the ending time in this way. Therefore, all the period of time when the printing unit waits for the print image to which the RIP is performed can be accurately used as the image preparing time.

(3) In the present embodiment, times necessary for performing the RIP to the print data of the plurality of sheets can be respectively determined as the image preparing times. In this way, the image preparing time can be more accurately obtained by determining the image preparing times respectively from the print data of the plurality of sheets. According to this, for example, the waste of the paper sheet (blank region) can be reduced by coping with a case where a data amount is greatly changed between the plurality of print images.

(4) In the present embodiment, when the times necessary to perform the RIP to the print data of the plurality of sheets have been respectively determined as the image preparing times, a difference between the maximum value and the minimum value of the obtained plurality of image preparing times is obtained. When the obtained difference is within a predetermined value, the linear velocity is determined from an average value of the plurality of image preparing times. According to this, when the difference of the data amount of the image is large, the printing unit can previously determine the linear velocity in a range that the speed can be changed.

(5) In the present embodiment, a first linear velocity and a second linear velocity which is slower than the first linear velocity can be used as the linear velocity which can be used by the printing unit. The linear velocity is set to the first linear velocity and the paper sheet interval C (second paper sheet interval) is determined to be used in a following case. The case is when the paper sheet interval is defined as an interval from the drawing end position of one image to the drawing start position of the next image, two cases are compared with each other, i.e., a case where the print is performed at the paper sheet interval C (second paper sheet interval) wider than the predetermined paper sheet interval B (first paper sheet interval) and at the first linear velocity and a case where the print is performed at the paper sheet interval B (first paper sheet interval) and at the second linear velocity, and then, a case where the print at the paper sheet interval C (second paper sheet interval) and at the first linear velocity ends faster (that is, the productivity is higher) when the same number of paper sheets are printed. According to this, the waste of the paper sheet (blank region) can be reduced as possible without deteriorating the productivity.

(6) In the present embodiment, relative to the label roll paper having a predetermined paper sheet interval, the paper sheet interval is automatically determined as the paper sheet interval which is determined in accordance with the label roll paper. According to this, an operation burden to the user can be reduced.

(7) In the present embodiment, the operation mode is automatically determined according to that the print media (paper sheet) is the simple roll paper or the label roll paper. Specifically, the label roll paper is used, "preventing waste of paper sheet top priority mode" in which the paper sheet interval is not changed is selected. When the paper sheet other than the label roll paper is used, "preventing waste of paper sheet priority mode" and "productivity priority mode" are selected. According to this, an operation burden to the user can be reduced.

(8) In the present embodiment, the operation mode is determined by the selection of the user. Specifically, when the roll paper is used, "preventing waste of paper sheet priority mode" and "productivity priority mode" are selected. According to this, the request of the user can be satisfied.

(9) In the present embodiment, the determined linear velocity is held. According to this, the user can recognize the current linear velocity.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising:
   a printing unit configured to print on a print medium at a plurality of linear velocities; and
   a hardware processor which comprises a CPU and which is configured to operate as:
      an image preparing time determination unit configured to determine a print image preparing time necessary for developing print data to a print image to be printed on the print medium by the printing unit from a time necessary for developing the print data of a plurality of sheets to respective print images;
      a linear velocity determination unit configured to determine a linear velocity from an average value of a plurality of print image preparing times in a case where a difference between a maximum value and a minimum value of the plurality of print image preparing times is within a predetermined value; and
      an engine control unit configured to operate the printing unit at the linear velocity determined by the linear velocity determination unit.

2. The image forming apparatus according to claim 1, wherein the image preparing time determination unit determines a necessary time from an ending time of the development of the print data of a first sheet to the print image to an ending time of the development of the print data of a second sheet to the print image as the print image preparing time.

3. The image forming apparatus according to claim 1, wherein the printing unit is capable of printing at a first linear velocity and a second linear velocity slower than the first linear velocity and defines an interval from a drawing end position of one image to a drawing start position of a next image as a paper sheet interval,
   wherein the linear velocity determination unit compares a case where print is performed at the first linear velocity at a second paper sheet interval which is wider than a first paper sheet interval and a case where the print is performed at the first paper sheet interval and at the second linear velocity and determines the first linear velocity as the linear velocity and the second paper sheet interval as the paper sheet interval in a case where the print performed at the second paper sheet interval and at the first linear velocity ends faster when a same number of the paper sheets are printed.

4. The image forming apparatus according to claim 1, wherein the linear velocity determination unit determines a paper sheet interval so as to be a predetermined paper sheet interval when a print media to be used to print is label roll paper.

5. The image forming apparatus according to claim 1, wherein the hardware processor is further configured to operate as an operation mode setting unit which is configured to set a mode according to a print media to be used to print to an operation mode for determining the linear velocity based on the print image preparing time or to another operation mode.

6. The image forming apparatus according to claim 1, wherein the hardware processor is further configured to operate as an operation mode setting unit which is configured to set a mode according to an input from a user to an operation mode for determining the linear velocity based on the print image preparing time or to another operation mode.

7. The image forming apparatus according to claim 1, further comprising a linear velocity display configured to display the linear velocity determined by the linear velocity determination unit on an operation panel to inform a user of the linear velocity.

8. An image forming method of an image forming apparatus including a printing unit configured to print on a print medium at a plurality of linear velocities, the image forming method comprising:
determining a print image preparing time necessary for developing print data to a print image to be printed on the print medium by the printing unit from a time necessary for developing the print data of a plurality of sheets to respective print images;
determining a linear velocity from an average value of a plurality of print image preparing times in a case where a difference between a maximum value and a minimum value of the plurality of print image preparing times is within a predetermined value; and
operating the printing unit at the determined linear velocity and printing.

9. The image forming method according to claim 8, wherein a necessary time from an ending time of the development of the print data of a first sheet to the print image to an ending time of the development of the print data of a second sheet to the print image is determined as the print image preparing time.

10. The image forming method according to claim 8, wherein the printing unit is capable to print at a first linear velocity and a second linear velocity slower than the first linear velocity and defines an interval from a drawing end position of one image to a drawing start position of a next image as a paper sheet interval, and
wherein a case where print is performed at the first linear velocity and at a second paper sheet interval which is wider than a first paper sheet interval and a case where the print is performed at the first paper sheet interval and at the second linear velocity are compared and the first linear velocity is determined as the linear velocity and the second paper sheet interval is determined as the paper sheet interval in a case where the print performed at the second paper sheet interval and at the first linear velocity ends faster when a same number of the paper sheets are printed.

11. The image forming method according to claim 8, wherein a paper sheet interval is determined so as to be a predetermined paper sheet interval when a print media to be used to print is label roll paper.

12. The image forming method according to claim 8, further comprising setting a mode according to a print media to be used to print to an operation mode for determining the linear velocity based on the print image preparing time or to another operation mode before the print image preparing time is determined.

13. The image forming method according to claim 8, further comprising setting a mode according to an input from a user to an operation mode for determining the linear velocity based on the print image preparing time or to another operation mode before the print image preparing time is determined.

14. The image forming method according to claim 8, further comprising displaying the determined linear velocity on an operation panel to inform a user of the linear velocity.

15. The image forming apparatus according to claim 1, wherein the print medium is a continuous paper sheet.

16. The image forming method according to claim 8, wherein the print medium is a continuous paper sheet.

* * * * *